(12) United States Patent
Musik et al.

(10) Patent No.: US 11,590,599 B2
(45) Date of Patent: Feb. 28, 2023

(54) RESISTANCE SPOT WELDING METHOD FOR JOINING ZINC COATED STEEL SHEETS

(71) Applicants: ArcelorMittal, Luxembourg (LU); Universite de Nantes, Nantes (FR)

(72) Inventors: Céline Musik, Piblange (FR); Kangying Zhu, Metz (FR); Didier Hun, Nancy (FR); Jean-Michel Mataigne, Senlis (FR); Astrid Perlade, Le Ban-Saint-Martin (FR); Renaud Frappier, Sainte Cécile (FR)

(73) Assignee: ArcelorMittal, Luxembourg (LU)

( * ) Notice: Subject to any disclaimer, the term of this patent is extended or adjusted under 35 U.S.C. 154(b) by 606 days.

(21) Appl. No.: 16/492,437

(22) PCT Filed: Feb. 27, 2018

(86) PCT No.: PCT/IB2018/051239
§ 371 (c)(1),
(2) Date: Sep. 9, 2019

(87) PCT Pub. No.: WO2018/163017
PCT Pub. Date: Sep. 13, 2018

(65) Prior Publication Data
US 2020/0009679 A1   Jan. 9, 2020

(30) Foreign Application Priority Data
Mar. 7, 2017 (WO) .................. PCT/IB17/00218

(51) Int. Cl.
| | | |
|---|---|---|
| *B23K 11/11* | (2006.01) | |
| *B23K 11/16* | (2006.01) | |
| *B32B 15/01* | (2006.01) | |
| *B23K 101/18* | (2006.01) | |
| *B23K 103/04* | (2006.01) | |
| *B23K 101/34* | (2006.01) | |
| *B23K 101/00* | (2006.01) | |

(52) U.S. Cl.
CPC .......... *B23K 11/115* (2013.01); *B23K 11/166* (2013.01); *B32B 15/013* (2013.01); *B23K 2101/006* (2018.08); *B23K 2101/18* (2018.08); *B23K 2101/34* (2018.08); *B23K 2103/04* (2018.08)

(58) Field of Classification Search
USPC ....................................................... 219/91.2
See application file for complete search history.

(56) References Cited

U.S. PATENT DOCUMENTS

| | | |
|---|---|---|
| 5,793,011 A | 8/1998 | Watabe |
| 5,857,141 A | 1/1999 | Keegan et al. |
| 7,118,809 B2 | 10/2006 | Utsumi |
| 8,747,577 B2 | 6/2014 | Yoshinaga |
| 2004/0112872 A1 | 6/2004 | Chen |
| 2010/0132849 A1 | 6/2010 | Takagi et al. |
| 2014/0030548 A1 | 1/2014 | McConnell |
| 2014/0120371 A1* | 5/2014 | Mbacke .................. C22C 38/06 148/522 |
| 2015/0174690 A1* | 6/2015 | Furusako ............. B23K 11/241 219/91.22 |

FOREIGN PATENT DOCUMENTS

| | | | | |
|---|---|---|---|---|
| CN | 1128192 A | 2/2003 | | |
| CN | 1858286 A | 6/2009 | | |
| CN | 1860249 B | 9/2012 | | |
| CN | 102712980 A | * 10/2012 | ........... | C21D 8/0436 |

(Continued)

OTHER PUBLICATIONS

Jens Kondratiuk et al., Zinc coated for hot sheet metal forming: Comparison of phase evolution and microstructure during heat treatment, 2010, Elsevier Surface and Coating Technology (Year: 2010).*
Funakawa Y et al. CN102149840B, English Translation (Year: 2013).*
B Gao et al., CN104084686A, English Translation (Year: 2017).*
Y Chisato et al., WO-2017038981A1, English Translation (Year: 2017).*
Kouichi S et al., CN102712980A, English Translation (Year: 2012).*
International Preliminary Report on Patentability for PCT/IB2018/051239 dated Mar. 27, 2019.
International Search Report for PCT/IB2018/051239 dated Apr. 4, 2018.

(Continued)

*Primary Examiner* — Ibrahime A Abraham
*Assistant Examiner* — Simpson A Chen
(74) *Attorney, Agent, or Firm* — Davidson, Davidson & Kappel, LLC

(57) ABSTRACT

A method for resistance spot welding comprising the following successive steps: —providing at least two steel sheets with thickness (th) comprised between 0.5 and 3 mm, at least one of the sheets being a zinc or zinc-alloy coated steel sheet (A) with a tensile strength (TS) higher than 800 MPa and a total elongation (TEL) such as (TS)×(TEL) >14000 MPa %, wherein the composition of the steel substrate of (A) contains, in weight: 0.05%≤C≤0.4%, 0.3%≤Mn≤8%, 0.010%≤Al≤3%, 0.010%≤Si≤2.09%, with 0.5%≤(Si+Al)≤3.5%, 0.001%≤Cr≤1.0%, 0.001%≤Mo≤0.5% and optionally: 0.005%≤Nb≤0.1%, 0.005%≤V≤0.2%, 0.005%≤Ti≤0.1%, 0.0003%≤B≤0.005%, 0.001%≤Ni≤1.0%, the remainder being Fe and unavoidable impurities, —performing resistance spot welding of the at least two steel sheets for producing a weld with an indentation depth (IDepth) on the surface of said steel sheet (A) such as: 100 μm≤(IDepth)≤18.68 ($Zn_{sol}$)−55.1, wherein (IDepth) is in micrometers and wherein $Zn_{sol}$ is the solubility of Zn in the steel of sheet (A) at 750° C., in weight %.

20 Claims, No Drawings

(56) References Cited

FOREIGN PATENT DOCUMENTS

| | | | |
|---|---|---|---|
| CN | 102149840 B * | 12/2013 | ............... C21D 6/00 |
| CN | 104084686 A * | 10/2014 | ............. B23K 11/11 |
| EP | 0812647 A2 | 12/1997 | |
| EP | 2138599 A1 | 12/2009 | |
| JP | 2003164975 A | 6/2003 | |
| JP | 2004211158 A | 7/2004 | |
| JP | 2006035293 | 2/2006 | |
| JP | 2006265671 A | 10/2006 | |
| JP | 2012192455 A | 11/2012 | |
| RU | 2066264 C1 | 9/1996 | |
| RU | 2243071 C2 | 12/2004 | |
| RU | 2553314 C1 | 6/2015 | |
| WO | WO-2017038981 A * | 3/2017 | ............. B23K 11/11 |

* cited by examiner

RESISTANCE SPOT WELDING METHOD FOR JOINING ZINC COATED STEEL SHEETS

The present invention relates to a method of resistance spot welding of zinc-coated steel sheets, for achieving high mechanical resistance of the welds and reducing the risk of cracks formation due to Liquid Metal Embrittlement, particularly adapted to the requirements of the automotive industry.

Zinc or Zinc-alloy coated steel sheets are very effective for corrosion resistance and are thus widely used in the automotive industry. However, it has been experienced that arc or resistance welding of certain steels can cause the apparition of particular cracks due to a phenomenon called Liquid Metal Embrittlement ("LME") or Liquid Metal Assisted Cracking ("LMAC"). This phenomenon is characterized by the penetration of liquid Zn along the grain boundaries of underlying steel substrate, under applied stresses or internal stresses resulting from restraint, thermal dilatation or phases transformations. It has been recognized that a higher stress level increases the LME risk. Since the stresses that are present in a joint during the welding itself depend in particular of the strength of the base metal, it is recognized that welds made out of steels with higher strength are in general more sensitive to LME.

For reducing the LME risk, the publication EP0812647 discloses a method wherein gas shielding arc welding using a metal core wire containing Cu is performed. However, this process is not adapted for the joining of thin sheets in the automotive industry.

Furthermore, JP2006035293 discloses an arc welding method using a stainless steel wire for producing a weld containing more than 25% ferrite and for achieving a tensile strength in the weld less than 1.8 times the tensile strength in the base metal. However, further to the fact that this process is not adapted to the requirements of automotive industry, achieving a low strength in the weld is not desired.

Document JP2004211158 discloses also a process for Electro-Resistance Welding (ERW) of tubes, wherein 3-40 ppm Boron is present in the steel composition. However, the conclusions of this document are related to the specific conditions of the ERW process and cannot be derived simply to the resistance spot welding process. Furthermore, B addition is not desirable in every high strength steel grade.

Thus, it is desirable to have a method for manufacturing resistance spot welds of Zn-coated sheets that would conciliate two conflicting requirements:
- on one hand, to obtain a resistance spot weld with high tensile properties as measured in lap-shear test. This feature is generally higher when the tensile strength of the base metal is increased.
- on the other hand, to obtain a resistance spot weld with high resistance to LME, the occurrence of which is generally lower when the strength of the base metal is decreased.

It is in particularly desired to have a method wherein the depth of the eventual cracks due to LME would be kept at a value less than 20 micrometers, so not to reduce the mechanical performance of the welds. For the same reason, it is also desired to minimize the number of eventual cracks due to having a depth greater than 100 micrometers.

In view of solving such problem, the invention relates to a method for resistance spot welding comprising the following successive steps of:
  providing at least two steel sheets with thickness (th) comprised between 0.5 and 3 mm, at least one of the sheets being a zinc or zinc-alloy coated steel sheet (A) with a tensile strength (TS) higher than 800 MPa and a total elongation (TEL) such as (TS)×(TEL)>14000 MPa %, wherein the composition of the steel substrate of (A) contains, in weight: $0.05\% \leq C \leq 0.4\%$, $0.3\% \leq Mn \leq 8\%$, $0.010\% \leq Al \leq 3\%$, $0.010\% \leq Si \leq 2.09\%$, with $0.5\% \leq (Si+Al) \leq 3.5\%$, $0.001\% \leq Cr \leq 1.0\%$, $0.001\% \leq Mo \leq 0.5\%$ and optionally: $0.005\% \leq Nb \leq 0.1\%$, $0.005\% \leq V \leq 0.2\%$, $0.005\% \leq Ti \leq 0.1\%$, $0.0003\% \leq B \leq 0.005\%$, $0.001\% \leq Ni \leq 1.0\%$, the remainder being Fe and unavoidable impurities, performing resistance spot welding of the at least two steel sheets for producing a weld with an indentation depth (IDepth) on the surface of said steel sheet (A) such as: $100\,\mu m \leq (IDepth) \leq 18.68\,(Zn_{sol}) - 55.1$, wherein (IDepth) is in micrometers and wherein $Zn_{sol}$ is the solubility of Zn in the steel of sheet (A) at 750° C., in weight %.

According to an embodiment, the Zn solubility is such as: $Zn_{sol} = (1-f_\gamma) \times (Zn_{\alpha(750)}) + (f_\gamma \times Zn_{\gamma(750)})$, wherein $f_\gamma$ is the relative volume fraction of austenite existing in the steel sheet (A) at 750° C. and is comprised between 0 and 1, wherein $Zn_{\alpha(750)}$ and $Zn_{\gamma(750)}$ are the solubility of Zn respectively in the ferrite and in the austenite of the steel of sheet (A) at 750° C., in weight %, and wherein the peritectic temperature ($T_{per}$) of steel of sheet (A) in the presence of Zn is determined by: $(T_{per}) = 782 + (2.5\,Mn) - (71.1\,Si) - (43.5\,Al) - (57.3\,Cr)$, wherein $(T_{per})$ is in ° C., and Mn, Si, Al and Cr are in weight %, and:

$$Zn_{\alpha(750)} = Zn_{\alpha(Tper)} \times \left(1 + 0.68 \times \frac{(Tper) - 750}{600 - (Tper)}\right) \text{ if } (T_{per}) \text{ is } \geq 750°\,C.,$$

and $$Zn_{\alpha(750)} = Zn_{\alpha(Tper)} \times \left(1 + \frac{(Tper) - 750}{1160 - (Tper)}\right) \text{ if } (T_{per}) \text{ is } < 750°\,C.,$$

with $Zn_{\alpha(Tper)} = 45.9 - (0.13\,Mn) - (17.3\,C) + (4.8\,Si^2) - (25.4\,Si) - (1.53\,Al) - (0.73\,Cr)$ wherein $Zn_{\alpha(Tper)}$ is in ° C. and Mn, C, Si, Al and Cr are in weight %,
and wherein:

$$Zn_{\gamma(750)} = 2\left(-\frac{b(750 - Ae1)^2}{(Ae3 - Ae1)} + b(750 - Ae1)\right)$$

with:

$$b = \frac{28}{2(Ae3 - Ae1) - 1},$$

wherein $A_{e1}$ and $A_{e3}$ are expressed in ° C. and are the temperatures at which the transformation from ferrite to austenite respectively starts and finishes taking place.

According to a particular embodiment, $f_\gamma = \min\{-0.015 + (1.73 \times C) + (0.16 \times Mn) - (0.11 \times Si) - (0.22 \times Al) - (0.056 \times Cr); 1\}$ wherein C, Mn, Al, Si, Cr are in weight %.

According to a particular embodiment, $A_{e1}$ and $A_{e3}$ are such as:
$A_{e1} = 725 - (42.1\,Mn) + (27.3\,Si) + (9\,Al) + (5\,Cr)$
$A_{e3} = 923 - (360\,C) - (34\,Mn) + (37.6\,Si) + (131.6\,Al) - (24.9\,Cr)$, wherein C, Mn, Al, Si, Cr are in weight %.

In another particular embodiment, $Zn_{sol}$ is determined according to the method comprising the following successive steps:
    providing the coated steel sheet (A) of claim 1, then
    heat-treating the coated steel sheet (A) at 750° C. for a duration of 170 h, then
    cooling the sheet (A) at a rate higher than 50° C./s, then
    measuring the Zn content in the steel at a distance of 1 micron from the steel/Zn or Zn-alloy coating interface.

Preferably, at least one of the steel sheets welded to steel sheet (A) is a zinc or zinc-alloyed coated steel sheet (B) and the sum of the thicknesses of sheets (A) and (B) is not higher than 3 mm.

Still preferably, the sum of the thicknesses of sheets (A) and (B) is not higher than 2 mm According to a preferred embodiment, the zinc or zinc-alloyed coated steel sheet (B) is a steel with a composition containing: C≥0.04%, Mn≥0.2%, the remainder being Fe and unavoidable impurities.

According to another embodiment, the $Zn_{sol}$, $A_{e1}$ and $A_{e3}$ are calculated with $C_{av}$, $Mn_{av}$, $Si_{av}$, $Al_{av}$ and $Cr_{av}$,
$C_{av}$, $Mn_{av}$, $Si_{av}$, $Al_{av}$ and $Cr_{av}$ being respectively the average contents of C, Mn, Si, Al, Cr that are measured under the zinc coating of said sheet A over a depth ranging from 0 to 100 microns.

According to preferred embodiment, (IDepth)≥125 μm.

In a preferred mode, (IDepth) is measured through the displacement of the welding electrode and the welding process is stopped when (IDepth) is comprised between 100 microns and 18.68 ($Zn_{sol}$)≥55.1.

In another preferred mode, (IDepth) is measured through the displacement of the welding electrode and the welding process is stopped when (IDepth) is comprised between 125 microns and 18.68 ($Zn_{sol}$)—55.1.

In a preferred embodiment, the welding parameters are selected so that the maximum temperature attained during welding at the external part of the indentation zone of the weld is such that: $T_{max}$ (IDia)<Ac3.

The invention related also to a resistance spot weld comprising at least two steel sheets with thickness (th) comprised between 0.5 and 3 mm, at least one of the sheets being a zinc or zinc-alloy coated steel sheet (A) with a tensile strength (TS) higher than 800 MPa and a total elongation (TEL) such as (TS)×(TEL)>14000 MPa %, the composition of the steel substrate of (A) containing, in weight: 0.05%≤C≤0.4%, 0.3%≤Mn≤8%, 0.010%≤Al≤3% 0.010%≤Si≤2.09% with 0.5%≤(Si+Al)≤3.5%, 0.001%≤Cr≤1.0%, 0.001%≤Mo≤0.5% and optionally 0.005%≤Nb≤0.1%, 0.005%≤V≤0.2% 0.005%≤Ti≤0.1%, 0.0003%≤B≤0.005%, 0.001%≤Ni≤1.0%, the remainder being Fe and unavoidable impurities, wherein the indentation depth (IDepth) on the surface of said steel sheet (A) is such as: 100 μm≤(IDepth)≤18.68 ($Zn_{sol}$)−55.1, wherein (IDepth) is in micrometers and wherein $Zn_{sol}$ is the solubility of Zn in the steel of sheet (A) at 750° C., in weight %.

According to a preferred embodiment, the resistance spot weld is such as (IDepth)≥125 μm.

In a preferred embodiment, the resistance spot weld contains a steel sheet (A) with a zinc or zinc-alloy coating, which has a composition with Si content≥0.5%.

Preferably, the resistance spot weld contains a steel sheet (A) with a zinc or zinc-alloy coating, which has composition with Si content≥0.7%.

According to a preferred embodiment, the resistance spot weld contains a steel sheet (A) with a zinc or zinc-alloy coating, which contains a surface fraction of retained austenite comprised between 7 and 30%.

According to another preferred embodiment, the resistance spot weld contains a steel sheet (A) which contains an average of local concentrations in C, Mn, Al, Si and Cr, over a depth comprised between 0 and 100 microns, which is different from the bulk composition of the steel sheet (A)

The invention relates also to the use of a resistance spot weld as described in one or several of the embodiments described above, or manufactured according to one or several of the embodiments described above, for the fabrication of structural or safety parts of automotive vehicles.

The invention will now be described in details and illustrated by examples without introducing limitations.

First, steel sheets are provided with a thickness (th) comprised between 0.5 and 3 mm which is a typical thickness range used in the automotive industry.

These sheets may have all the same thickness or different thicknesses. In the latter case, $th_{max}$ designates the highest thickness of the provided sheets. These sheets are zinc or zinc-alloy coated sheets, the latter expression designating coatings wherein the Zn content is higher than 50% in weight. In particular, the coating can be obtained by Hot-Dip-Galvanizing ("GI"), or by hot-dip galvanizing immediately followed by a heat-treatment at about 500-570° C. so to cause diffusion of iron in the coating and to obtain a "galvannealed", or "GA" coating containing about 7-14% Fe. It can be also a zinc or zinc-alloy coating obtained by an electroplating process or by a Vacuum deposition process. The Zn-alloy can be also a Zn—Mg—Al coating, such as for example a Zn—3% Mg—3.7% Al, or a Zn—1.2% Al—1.2% Mg coating. At least one sheet (A) of these coated sheets is made out of a High-Formable steel with a tensile strength (TS) higher than 800 MPa and a total elongation (TEL) such as (TS)×(TEL)>14000 MPa %. The steel sheets implemented in the invention are fabricated through a process comprising successively the steps of casting, hot rolling, coiling, optionally intermediate annealing, pickling, cold rolling, continuous annealing, and coating. Depending on their mechanical properties, composition and fabrication process, the microstructure of these sheets contains, in surface fraction between 5 and 30% of retained austenite. According to the thermomechanical cycle on the industrial line, these coated steels may be for example TRIP (Transformation Induced Plasticity) steels, CFB (Carbides Free Bainite) steels, or Q-P (Quench and Partitioning) steels. The composition of the High-Formable sheet (A) contains:

Carbon: between 0.05% and 0.4% by weight. If the carbon content is below 0.05%, the tensile strength is insufficient and the stability of the retained austenite which is present in the steel microstructure for achieving sufficient elongation, is not obtained. Above 0.4% C, weldability is reduced because low toughness microstructures are formed in the Heat Affected Zone or in the molten zone of the spot weld. In one preferred embodiment, the carbon content is in the range between 0.13 and 0.25%, which makes it possible to achieve a tensile strength higher than 1180 MPa.

Manganese is a solid solution hardening element which contributes to obtain a tensile strength higher than 800 MPa. Such effect is obtained when Mn content is at least 0.3% in weight. However, above 8%, its presence contributes to the formation of a structure with excessively marked segregation bands which can adversely affect the hardenability of the welds and the use properties of the automobile structural part. The coatability is also adversely reduced. Preferably, the manganese content is in the range between 1.4% and 4% to achieve these effects. This makes it possible to achieve satisfactory mechanical strength without increasing the difficulty of industrial fabrication of the steel and without increasing the hardenability in the welded alloys which would adversely affect the weldability of the sheet claimed by the invention.

Silicon must be comprised between 0.010 and 2.09% to achieve the requested combination of mechanical properties and weldability: silicon reduces the carbides precipitation during the annealing after cold rolling of the sheet, due to its low solubility in cementite and due to the fact that this element increases the activity of carbon in austenite. Thus, the enrichment of austenite in carbon leads to its stabilization at room temperature and to the apparition of a Transformation Induced Plasticity ("TRIP") behavior which means that the application of a stress, during forming for example, will lead to the transformation of this austenite into martensite. When Si is higher than 2.09%, strongly adhering oxides could be formed during annealing before hot dip galvanizing, which could lead to surface defects in the coating. Silicon content above 0.5% contributes to an efficient stabilization of austenite, while Si content above 0.7% contributes to obtain a surface fraction of retained austenite comprised between 7 and 30%.

Aluminum must be comprised between 0.010 and 3.0%. With respect to the stabilization of retained austenite, aluminum has an influence that is relatively similar to the one of the silicon. However, since aluminum promotes efficiently the formation of ferrite at high temperature, an excessive aluminum addition would increase the Ac3 temperature (i.e. the temperature of complete steel transformation into austenite during heating) during the annealing step, and would therefore make the industrial process expensive in terms of electric power required for annealing. Thus, Al content is less than 3.0%.

Retained austenite between 5 and 30% at room temperature is necessary for achieving high total elongation. The formability is particularly high when the surface fraction of retained austenite is comprised between 7 and 30%. A sufficient stabilization of the austenite is obtained through the addition of silicon and/or aluminum in the steel composition, in quantities such as: (Si+Al)≥0.5%. If (Si+Al)<0.5%, the fraction of retained austenite could be below 5%, thus the ductility and strain hardening properties in cold-forming are insufficient. However, if (Si+Al)>3.5%, the coatability and the weldability are impaired.

Chromium hardens and refines the microstructure, and makes it possible to control the formation of proeutectoid ferrite during the cooling step after holding at the maximal temperature during the annealing cycle. In the case of steels that do not contain more than 2.8% Mn, ferrite, when present in surface fraction higher than 40%, increases the risk that the tensile strength is lower than 800 MPa. Thus, the chromium content is higher than 0.001% and less than 1.0% for reasons of cost and for preventing excessive hardening.

As chromium, molybdenum in quantity comprised between 0.001% and 0.5% is efficient for increasing the hardenability and stabilizing the retained austenite since this element delays the decomposition of austenite.

The steels may optionally contain elements susceptible to precipitate under the form of carbides, nitrides, or carbonitrides, thus able to provide precipitation hardening. For this purpose, the steels may contain niobium, titanium or vanadium: Nb and Ti in quantity comprised between 0.005 and 0.1%, and V in quantity comprised between 0.005 and 0.2%.

The steels may optionally contain nickel, in quantity comprised between 0.001% and 1.0% so to improve the toughness.

The steels may optionally content also Boron, in quantity comprised between 0.0003 and 0.005%. By segregating at the grain boundary, B decreases the grain boundary energy and is thus beneficial for increasing the resistance liquid metal embrittlement.

The balance in the composition consists in iron and residual elements resulting from the steelmaking. In this respect, Cu, S, P and N at least are considered as residual elements or unavoidable impurities. Therefore, their contents are less than 0.03% for Cu, 0.003% for S, 0.02% for P and 0.008% for N.

Zinc or Zinc-alloy coated steels sheets, with at least one (A) of them having the composition above, are thereafter superposed and joined together by resistance spot welding. The welding can be homogeneous (i.e. welding of sheets (A) together) or heterogeneous (i.e. welding of a steel sheet (A) with one or more Zn-coated steels sheets (B) with different composition) Resistance spot welding is a process which combines the application of a force and a current flow, both being exerted on the superposed sheets to be welded through copper-alloy electrodes. A typical sequence of welding comprises the following successive steps:

approach of the electrodes and pressure application on the sheets welding sequence constituted by a certain number of periods during which the current successively flows ("pulses", "hot" periods) or does not flow ("cold" periods) During this sequence, the effort is maintained on the sheets by the electrodes. This effort makes it possible to reduce the shrinkage porosities and to obtain grain refinement.

holding period, during which the effort is maintained without current flow, in order to counterbalance the dilatation of the weld nugget and to cool it.

electrodes separation from the sheets which have been welded together.

At the end of the sequence, the weld is characterized by a nugget of weld metal which has been created at the interface between the steel sheets. Atop of this nugget, a circular depression, called indentation, is present on the surface of the sheets. The indentation diameter (IDia) corresponds to the diameter of the tip of the welding electrode. The indentation depth (IDepth) can be typically comprised between a few tens microns and a few hundreds microns. (IDepth) depends on factors such as:

the welding intensity I the effort F exerted by the electrodes during welding the duration of current flow $t_I$ the initial electric contact resistance R at the interface between the sheets the flow stress $\sigma_F$ at high temperature of the steel the stress concentration factor $K_t$ due to the geometry of the electrode tip the sheet thickness th The other variables being constant, the higher I, $t_I$, R, F, $K_t$, the higher (IDepth). The lower $\sigma_F$, the higher (IDepth)

(IDepth) can be measured either directly on cut spot welds or measured during the welding process itself as will be explained below. The inventors have put into evidence that the control of this indentation within a specific range, makes it possible to solve the problem of conciliating a sufficient mechanical weld resistance and a high resistance to LME.

The strength of resistance spot weld is usually measured by tensile lap shear test. In spite of its apparent simplicity, this test includes complex solicitation modes and failure mechanisms. In practice, the failure mode is considered as an index of the mechanical properties and can be classified into interfacial, partially interfacial and pullout. The pullout mode, wherein fracture occurs at the periphery of the button in the Heat Affected Zone or in the base metal, is desired since it is associated to the highest weld strength and ductility. This mode indicates that the weld is able to transmit a high level of effort thus causing significant plastic deformation in the adjacent regions and increasing strain energy absorption in crash conditions. On the contrary, weld failure at the interface between the sheets, leaving half of the weld nugget on each sheet, occurs at low loads and can affect the load repartition and cause reduction of absorbed energy in the welded structure. Such interfacial mode of failure is generally not acceptable by the automotive industry.

The inventors have put in evidence that the indentation (IDepth) must exceed a minimum value ((IDepth)$_{min}$) of 100 microns in order to ensure that the failure mode is the pullout mode. Without being bound by a theory, it is believed that when (IDepth)>(IDepth)$_{min}$, the nugget geometry, i.e. its diameter, height, and the stress concentration features at the interface between the welded sheets, make it possible to avoid interfacial failure. Such mechanical properties are even increased and are obtained in a very stable manner when (IDepth)$_{min}$ exceeds 125 microns.

However, the inventors have also put in evidence that the indentation (IDepth) must be kept below a maximum value (IDepth)$_{max}$ depending on steel composition, in order to avoid cracks due to Liquid Metal Embrittlement. These cracks, which are intergranular-type and filled with Zn, occur more frequently at the external corona of the indentation surface which materializes the former position of the electrode tip on the sheet.

This zone is more severely strained than the central part of the indentation zone.

Thus, corner cracks in this external zone are more frequently encountered than center cracks in the indentation area. Through observations with Infrared Thermography camera, the inventors have found that the zone where large corner cracks are present corresponds to the zone wherein the maximal temperature in the welding cycle has exceeded Ac3. The cracks appear at the end of the welding sequence as defined, at a temperature above 700° C. According to their thermal measurements and metallographic observations, the inventors have found that no LME deep crack, i.e. no crack deeper than 50 microns, is experienced when the maximum temperature at the location of the indentation diameter, i.e. $T_{max}$ (IDia) is less than Ac3. In other words, deep LME cracks are avoided if the welding parameters are selected such as $T_{max}$ (IDia) is less than Ac3. Since this condition can be obtained through various combinations of welding parameters, it would not be possible to define simply more in details such combinations. However, lowering I and $t_I$ and increasing F and R, tend to achieve this result.

Based on the observations that LME cracking occurred at a temperature above 700° C., on measurements of strains in the critical outer zone of the indentation zone and on measurement of critical strains in tensile tests performed in this temperature range on a Gleeble thermal simulator, the inventors have found out that LME cracking was avoided or very much reduced in the High Formable steel sheet (A) when the indentation depth (IDepth) was kept lower than a critical value (IDepth)$_{max}$ which depended from the Zn solubility in the steel substrate of (A), according to the expression:

$$(\text{IDepth}) \leq (\text{IDepth})_{max} = 18.68(Zn_{sol}) - 55.1 \quad (1)$$

$Zn_{sol}$ being the solubility of Zn in the steel of sheet (A) at 750° C., in weight %.

$Zn_{sol}$ may be directly measured according to the following method comprising the following successive steps:
  heat-treating the coated steel sheet (A) at 750° C. for a duration of 170 h. This step causes the diffusion from Zn into steel substrate to reach equilibrium state at the Zn-Substrate interface.
  cooling the sheet (A) at a rate higher than 50° C./s, which makes it possible to keep the high-temperature chemical gradients down to ambient temperature.
  measuring the Zn content in the steel at a distance of 1 micron from the steel/Zn or Zn-alloy coating interface. This Zn content may be measured for example by Energy Dispersive Spectrometry of X-Ray which is a technique known per se. In these conditions, the Zn content measured at the distance of 1 micron is the value of the solubility $Zn_{sol}$.

Alternatively, $Zn_{sol}$ can be calculated by taking into account the volume or surface fraction (these two quantities being identical) of austenite which is present in the steel (A) at 750° C., and the solubilities of Zn in ferrite and in austenite at this temperature according to the expression:

$$Zn_{sol} = (1-f_\gamma) \times (Zn_{\alpha(750)}) + (f_\gamma \times Zn_{\gamma(750)}) \quad (2)$$

wherein $f_\gamma$ is the volume fraction of austenite existing in the steel sheet (A) at 750° C. and is comprised between 0 and 1, and wherein $Zn_{\alpha(750)}$ and $Zn_{\gamma(750)}$ are the solubility of Zn respectively in the ferrite and in the austenite of the steel of sheet (A) at 750° C., in weight %.

The Zn solubility in ferrite at 750° C. depends on the peritectic temperature ($T_{per}$) of the steel (A) in the presence of Zn coating (i.e. the temperature above which steel substrate saturated with Zn is in thermodynamic equilibrium with liquid Zn alloyed with Fe and eventually other substitutional elements from the steel substrate), and on the Zn solubility $Zn_{\alpha(Tper)}$ at the peritectic temperature. ($T_{per}$) is determined by:

$$(T_{per}) = 782 + (2.5Mn) - (71.1Si) - (43.5Al) - (57.3Cr) \quad (3)$$

wherein ($T_{per}$) is in ° C., and Mn, Si, Al and Cr are in weight %. Depending if ($T_{per}$) is inferior or not to 750° C., $Zn_{\alpha(750)}$ can be calculated according to:

$$Zn_{\alpha(750)} = Zn_{\alpha(Tper)} \times \left(1 + 0.68 \times \frac{(Tper) - 750}{600 - (Tper)}\right) \quad (4)$$

if ($T_{per}$) is $\geq 750°$ C., and $$Zn_{\alpha(750)} = Zn_{\alpha(Tper)} \times \left(1 + \frac{(Tper) - 750}{1160 - (Tper)}\right) \quad (5)$$

if ($T_{per}$) is $< 750°$ C.

The solubility of Zn at the peritectic temperature in ferrite can be calculated according to:

$$Zn_{\alpha(Tper)} = 45.9 - (0.13Mn) - (17.3C) + (4.8Si^2) - (25.4Si) - (1.53Al) - (0.73Cr) \quad (6)$$

wherein $Zn_{\alpha(Tper)}$ is in ° C. and Mn, C, Si, Al and Cr are in weight %, The solubility of Zn in austenite is determined by:

$$Zn\gamma_{(750)} = 2\left(-\frac{b(750-Ae1)^2}{(Ae3-Ae1)} + b(750-Ae1)\right) \quad (7)$$

$$\text{with: } b = \frac{28}{2(Ae3-Ae1)-1} \quad (8)$$

wherein $A_{e1}$ and $A_{e3}$ are expressed in °C. and are the temperatures at which the transformation from ferrite to austenite respectively starts and finishes taking place at equilibrium in steel substrate of sheet (A).

$A_{e1}$ and $A_{e3}$ can either be measured for example by usual techniques based on dilatometry or can be calculated from the composition of steel (A) according to the following expressions:

$$A_{e1} = 725 - (42.1Mn) + (27.3Si) + (9Al) + (5Cr) \quad (9)$$

$$A_{e3} = 923 - (360C) - (34Mn) + (37.6Si) + (131.6Al) - (24.9Cr) \quad (10)$$

wherein $A_{e1}$ and $A_{e3}$ are in °C., and C, Mn, Al, Si, Cr are in weight %.

In a particular embodiment, the inventors have put into evidence that the method of the invention is advantageously implemented by taking into consideration the local composition of the steel just below the Zn or the Zn-alloy coating. In other words, rather than considering the nominal contents of C, Mn, Si, Al and Cr in the expressions (3), (6), (9) and (10) above, the inventors have put in evidence that the risk of LME cracking was optimally reduced by considering the average content of the elements: $C_{av}$, $Mn_{av}$, $Si_{av}$, $Al_{av}$ and $Cr_{av}$, as measured under the zinc or over a depth comprised between 0 and 100 microns under the Zn or Zn-alloy coating. This embodiment is especially relevant when a certain level of segregation is present throughout the sheet thickness or when a heat treatment performed on the steel substrate has modified the surface composition before the coating step. Thus, the average of local concentrations in C, Mn, Al, Si and Cr, over a depth comprised between 0 and 100 microns can be different from the bulk composition in the steel, and are more relevant to predict the occurrence of LME. As the inventors have shown that the very large majority of LME cracks have a depth comprised between 0 and 100 microns, the average content in C, Mn, Al, Si and Cr is taken into account within this depth range. These average contents can be measured by a technique known per se, such as for example Glow-Discharge Optical Emission Spectroscopy (GDOES)

According to their experiments, the inventors have also put into evidence that the risk of LME occurrence increases when the sum of the thicknesses of the sheets (A) and (B) is greater than 2 mm. Thus, in order to ensure that the average LME crack depth in the spot resistance welds is smaller than 40 μm, the sum of the thicknesses of the sheets (A) and (B) must be less than 3 mm. The average crack depth can be even reduced to a value lower than 20 μm if the sum of the thicknesses of the sheets (A) and (B) is not higher than 2 mm. Thus, in order to ensure that the average LME crack depth in the spot resistance welds is smaller than 40 or 20 μm, the sum of the thicknesses of the sheets (A) and (B) must be not higher than 3 or 2 mm respectively.

As a particular embodiment, the High Formable steel sheet (A) is welded with at least a Hot Dip Galvanized steel sheet (B) with a composition containing: C≥0.04%, Mn≥0.2%, the remainder being Fe and unavoidable impurities.

According to experiments performed by the inventors, the occurrence and severity of LME increase when the steel sheet (B) is a steel with a composition with C and Mn contents significantly lower than the ones of steel (A), i.e. when the steel (B) has a composition such as: C<0.04% and Mn<0.2%. Without wishing to be bound by theory, it is believed that the spot welding creates a molten zone with an intermediate composition between sheets (A) and (B). If the difference of composition between (A) and (B) is large, the transformation temperatures of steel (A) and the nugget will be very different, meaning that some zones can undergo a phase transformation during the cooling step of the welding cycle while others ones very close have not undergone yet such transformation. As phases transformation occur with volume changes, it is believed that such situation creates an increase in transient stresses which are detrimental in view of Liquid Metal Embrittlement. Thus, in view to mitigate LME, given the compositions implemented in the invention, it is preferred to avoid to provide for steel (B) a composition with low C (C<0.04%) and low Mn (Mn<0.2%)

The invention will be now illustrated by the following examples, which are by no way limitative.

EXAMPLE 1

Three steel sheets have been provided, referenced as SA, SB and SC. The composition of these steels expressed in weight %, the balance being iron and unavoidable elements resulting from the steelmaking, is presented in table 1. Among the residual or unavoidable elements, S content is less than 0.003% and P content is less than 0.014% for these steels. The sheets are coated with an electroplated Zn coating, 16 μm thick.

The Zn solubility $Zn_{sol}$ at 750° C. calculated according to expressions (2-10) above is also presented in Table 1 together with the tensile mechanical properties of the steels (UTS: Ultimate Tensile Strength, TEL: Total Elongation) measured according to ISO standard ISO 6892-1 published in Oct. 2009, are presented in Table 1. The thickness of steel sheets SA-SB is 1 mm, the thickness of steel sheet SC is 1.2 mm.

TABLE 1

Compositions (weight %), Zn solubility at 750° C. and tensile properties of the steels

|    | C     | Mn   | Si   | Al    | Si + Al | Cr   | Mo    | Nb, V, Ti                    | Znsol (%) | UTS (MPa) | UTSx TEL (MPa %) |
|----|-------|------|------|-------|---------|------|-------|------------------------------|-----------|-----------|------------------|
| SA | 0.20  | 1.65 | 1.63 | 0.06  | 1.69    | 0.03 | 0.002 | Nb: 0.001 Ti: 0.006 V: 0.001 | 9.09      | 820       | 23780            |
| SB | 0.20  | 1.64 | 0.80 | 0.68  | 1.48    | 0.04 | 0.002 | Nb: 0.001                    | 15.9      | 805       | 23200            |
| SC | 0.219 | 2.07 | 1.48 | 0.034 | 1.514   | 0.35 | 0.002 | Nb: 0.002b                   | 9.44      | 1233      | 16645            |

The steel sheets have been resistance spot welded with an electrode having a 6 mm tip diameter and a 50 Hz alternating current under a force of 350 daN. According to intensity and to the duration times of resistance welding, various indentation depths have been obtained. For example, for steel (SA), welding conditions SA1, SA2, SA3 . . . make it possible to obtain different indentation depths.

The strength of resistance spot welds has been measured by tensile lap shear tests according to ISO standard 14273. The result of the test is considered as satisfactory if no interfacial failure is observed.

The welds have been thereafter pickled in a dilute HCl solution containing inhibitor so as to remove zinc coating, cut and polished so to determine and measure under a magnification of 2.5 to 100×, the eventual presence of cracks due to Liquid Metal Embrittlement. The crack depth was measured on ten welds so to derive the average crack depth per weld face. It is desired to obtain an average crack depth less than 20 μm.

The results of the observations are presented in Table 2, together with the calculation of ($IDepth_{max}$) according to expression (1) above.

TABLE 2

Characterization of LME cracks in the welds and failure mode of the weld in lap tensile tests

| Steel | Weld | Indentation depth max ($IDepth_{max}$) (μm) | Indentation depth (IDepth) (μm) | Average crack depth (μm) | Absence of interfacial failure mode in tensile test |
|---|---|---|---|---|---|
| SA | SA1 | 114 | 70 | 0 | No |
|  | SA2 |  | 110 | 0 | Yes |
|  | SA3 |  | 130 | 35 | Yes |
|  | SA4 |  | 200 | 12 | Yes |
| SB | SB1 | 241 | 75 | 0 | No |
|  | SB2 |  | 150 | 16 | Yes |
|  | SB3 |  | 260 | 90 | Yes |
| SC | SC1 | 121 | 70 | 18 | No |
|  | SC2 |  | 125 | 40 | Yes |
|  | SC3 |  | 250 | 60 | Yes |

Underlined values: not according to the invention

EXAMPLE 2

The steel sheet SC of example 1 has been assembled through resistance spot welding to a steel SD, the composition of which is presented in Table 3, the remainder being iron and unavoidable impurities resulting from steelmaking.

TABLE 3 composition of steel SD (weight %)

|  | C | Mn | Si | Al | Ti |
|---|---|---|---|---|---|
| SD | 0.0018 | 0.083 | 0.006 | 0.053 | 0.04 |

Steel SD was provided under the form of Hot-Dip galvanized steel sheets with different thicknesses of 0.8 mm or 1.9 mm, with a Zn coating of 12 microns. Thus, resistance spot welds with a total thickness of 2 or 3.1 mm were fabricated. The average crack depth at the surface of the spot weld of steel sheet SC has been determined in the same manner as explained in example 1.

TABLE 4

Crack depth in welds having different total thicknesses.

| Total thickness of the weld (mm) | Indentation depth (IDepth) (μm) | Average crack depth (μm) |
|---|---|---|
| 2 | 71 | 19 |
| 3.1 | 256 | 42 |

Thus, reducing the total thickness under 3 or even 2 mm, makes it possible to fabricate the spot welds with a reduced average crack depth.

EXAMPLE 3

A resistance spot welding machine with a pneumatic jack of 10 kN and an electric power transformer of 64 kVA has been equipped with a sensor able to record the vertical displacement of the welding electrode. The difference between the position of the electrode before and after the welding operation, corresponds to the indentation depth (IDepth). In parallel, a high speed camera has been provided and a mark on the welding electrode has been made so to be an index for recording the position of the electrode during the welding operation. After comparison with the values of indentation measured on the welds themselves, it was stated that the two methods (sensor and high speed camera) were able to provide accurately the value of (IDepth) In the conditions explained in example 1, steel SB has been provided and welded with welding cycles that have been stopped when (IDepth) reaches a value either above the maximum indentation depth $IDepth_{max}$ according to this steel composition, or below it. The results are presented in the Table 4.

TABLE 4

Characterization of LME cracks and failure mode in welds interrupted according to the indentation value.

| Steel | Weld | Indentation depth max ($IDepth_{max}$) (μm) | Indentation depth at stop (IDepth) (μm) | Average crack depth (μm) | Absence of interfacial failure mode in lap tensile test |
|---|---|---|---|---|---|
| SB | SB4 | 241 | 160 | 13 | Yes |
|  | SB5 |  | 300 | 52 | Yes |

Underlined values: not according to the invention

Thus, the electrode displacement can be used so as an input signal indicating that the welding operation must be stopped and to ensure thereby the weld quality.

EXAMPLE 4

An Infrared camera with an InSb detector has been used so to measure the temperature of the surface of the sheet at the immediate periphery of the electrode, i.e. at the location of the indentation diameter (IDia). During the welding cycle, the temperature rises up to a maximum $T_{max}$ (IDia) before cooling once the current is stopped. Thus, it is thus possible to compare the measured temperature $T_{max}$ (IDia) with the Ac3 temperature of the steel. Tests have been performed on steels SA-SB as mentioned in Example 1, using different parameters so as to obtain various indentation depths. The presence of corner cracks due to LME, deeper than 50 μm, has been assessed. For steels SA and SB, the values of Ac3 are 930° C. and 965° C. respectively.

TABLE 5

Characterization of temperature and cracks at the periphery of the indentation area.

| Steel | Weld | Indentation depth (IDepth) (μm) | $T_{max}$ (IDia) (° C.) | Presence of corner cracks deeper than 50 μm |
|---|---|---|---|---|
| SA | SA4 | 110 | 630 | No |
|  | SA5 | 150 | 700 | No |
|  | SA6 | 300 | <u>950</u> | Yes |
| SB | SB6 | 160 | 720 | No |
|  | SB7 | 260 | 920 | No |
|  | SB8 | 350 | <u>980</u> | Yes |

Underlined values of Tmax(IDIA): not corresponding to the invention

Thus, it is observed that deep LME corner cracks are avoided when the welding parameters are selected such as $T_{max}$ (IDia) is less than Ac3.

EXAMPLE 5

The steel SC in the uncoated state has been heated so as to produce a modification of the composition at its surface within a depth of 100 microns, and thereafter Zn coated by electroplating so as to obtain a coating identical as the one of Example 1. The average contents $C_{av}$, $Mn_{av}$, $Si_{av}$, $Al_{av}$ and $Cr_{av}$ under the zinc over a depth comprised between 0 and 100 microns under the Zn coating have been measured by Glow-Discharge Optical Emission Spectroscopy. The coated steel sheet has been welded in a condition SC4 similar to the condition SC3 of table 2.

The average number of cracks having a depth greater than 100 μm per spot weld was measured. These results are presented in Table 6, together with the calculation of (IDepth$_{max}$) according to the expressions (1-10) above, taking into account either the nominal composition of the steel sheet C, or the average composition over a depth comprised between 0 and 100 microns under the Zn coating.

TABLE 6 number of cracks as a function of the bulk or surface composition

| Steel | Weld | Indentation depth max (IDepth$_{max}$) (μm) | Average number of LME cracks per weld with depth greater than 100 μm |
|---|---|---|---|
| SC | SC3 | 121 | 3.4 |
|  | SC4 Modified surface composition within a depth of 100 μm | 176 | 1.5 |

Trials SC3 and SC4 have been performed from the same nominal composition of steel SC. Using only the nominal composition of steel SC for these trials for the calculation of the maximal indentation depth would lead to the prediction that the trials results would be the same. However, in trial SC4, the number of large cracks is much reduced as compared to trial SC3. This shows that, in case where the surface of the steel undergoes composition change, the maximal indentation depth must be calculated from the average composition over a depth of 100 microns, rather than from the bulk steel composition.

EXAMPLE 6

Two Zn-coated steel sheets, 1.6 mm thick, having the composition of steel SC in table 1, were resistance spot welded so to create a weld SC4. Furthermore, a steel sheet SC, 1.6 mm thick, has been welded with a steel sheet SD, 1.6 mm thick, having the composition of table 3 so to create a weld SC5. The number of cracks in the two welds is presented in table 7.

TABLE 7

Crack number as a function of composition difference between the steel sheets

| Weld | Average number of LME cracks per weld |
|---|---|
| SC4 | 6 |
| SC5 | 15 |

As the steel sheet SD is very low in C and in Mn, the difference of compositions in C and Mn between steels SC and SD is high, and the risk of crack formation is increased.

By comparison, in the homogeneous weld SC4, the number of cracks is reduced.

Thus, due to their high mechanical properties, the resistance spot welds made out of formable high strength steels manufactured according to the invention can be used with profit for the fabrication of structural or safety parts of automotive vehicles.

What is claimed is:

1. A method for resistance spot welding comprising the following successive steps: providing at least two steel sheets with thicknesses comprised between 0.5 and 3 mm, at least one of the sheets being a zinc or zinc-alloy coated steel sheet (A) with a tensile strength (TS) higher than 800 MPa and a total elongation (TEL) such as (TS)×(TEL)>14000 MPa %, wherein a composition of the steel substrate of (A) contains, in weight:

0.05%≤C≤0.4%
0.3%≤Mn≤8%
0.010%≤Al≤3%
0.010%≤Si≤2.09%
with 0.5%≤(Si+Al)≤3.5%
0.001%≤Cr≤1.0%
0.001%≤Mo≤0.5%
and optionally
0.005%≤Nb≤0.1%
0.005%≤V≤0.2%
0.005%≤Ti≤0.1%
0.0003%≤B≤0.005%
0.001%≤Ni≤1.0% the remainder being Fe and unavoidable impurities, performing resistance spot welding of the at least two steel sheets for producing a weld with an indentation depth (IDepth) on the surface of said steel sheet (A), wherein 100 μm≤(IDepth)≤18.68 (Zn$_{sol}$)−55.1, wherein (IDepth) is in micrometers and wherein Zn$_{sol}$ is the solubility of Zn in the steel of sheet (A) at 750° C., in weight %, wherein Zn$_{sol}$ is determined according to the method comprising the following successive steps:

providing the zinc or zinc-alloy coated steel sheet (A), then heat-treating the coated steel sheet (A) at 750° C. for a duration of 170 h, then cooling the sheet (A) at a rate higher than 50° C./s, then measuring the Zn content in the steel at a distance of 1 micron from the steel/Zn or Zn-alloy coating interface.

2. A method according to claim 1, wherein:
$Zn_{sol}=(1-f_\gamma) \times (Zn_{\alpha(750)})+(f_\gamma \times Zn_{\gamma(750)})$
wherein $f_\gamma$ is a relative volume fraction of austenite existing in the steel sheet (A) at 750° C. and is comprised between 0 and 1, wherein $Zn_{\alpha(750)}$ and $Zn_{\alpha(750)}+(f_\gamma \times Zn_{\gamma(750)})$ are a solubility of Zn respectively in the ferrite and in the austenite of the steel of sheet (A) at 750° C., in weight %, and wherein a peritectic temperature ($T_{per}$r) of steel of sheet (A) in the presence of Zn is determined by:

$(T_{per})=782+(2.5 \text{ Mn})-(71.1 \text{ Si})-(43.5 \text{ Al})-(57.3 \text{ Cr})$, wherein ($T_{per}$) is in ° C., and Mn, Si, Al and Cr are in weight %, and:

$$Zn_{\alpha(750)} = Zn_{\alpha(Tper)} \times \left(1 + 0.68 \times \frac{(Tper) - 750}{600 - (Tper)}\right) \text{ if } (T_{per}) \text{ is } \geq 750° \text{ C.,}$$

and $$Zn_{\alpha(750)} = Zn_{\alpha(Tper)} \times \left(1 + \frac{(Tper) - 750}{1160 - (Tper)}\right) \text{ if } (T_{per}) \text{ is } < 750° \text{ C.,}$$

with $Zn_{\alpha(Tper)}=45.9-(0.13 \text{ Mn})-(17.3C)+(4.8 \text{ Si}^2)-(25.4 \text{ Si})-(1.53 \text{ Al})-(0.73 \text{ Cr})$
wherein $Zn_{\alpha(Tper)}$ is in ° C. and Mn, C, Si, Al and Cr are in weight %,
and wherein:

$$Zn_{\gamma(750)} = 2\left(-\frac{b(750 - Ae1)^2}{(Ae3 - Ae1)} + b(750 - Ae1)\right)$$

with: $b = \frac{28}{2(Ae3 - Ae1) - 1}$, wherein $A_{e1}$ and $A_{e3}$ are expressed in ° C. and are temperatures at which the transformation from ferrite to austenite respectively starts and finishes taking place.

3. A method according to claim 2 wherein:
$f_\gamma=\min\{-0.015+(1.73 \times C)+(0.16 \times Mn)-(0.11 \times Si)-(0.22 \times Al)-(0.056 \times Cr); 1\}$
wherein C, Mn, Al, Si, Cr are in weight %.

4. A method according to claim 2, wherein:
$A_{e1}=725-(42.1 \text{ Mn})+(27.3 \text{ Si})+(9 \text{ Al})+(5 \text{ Cr}) A_{e3}=923-(360 \text{ C})-(34 \text{ Mn})+(37.6 \text{ Si})+(131.6 \text{ Al})-(24.9 \text{ Cr})$
wherein C, Mn, Al, Si, Cr are in weight %.

5. A method according to claim 2, wherein $Zn_{sol}$, $A_{e1}$ and $A_{e3}$ are calculated with $C_{av}$, $Mn_{av}$, $Si_{av}$, $Al_{av}$ and $Cr_{av}$, $C_{av}$, $Mn_{av}$, $Si_{av}$, $Al_{av}$ and $Cr_{av}$ being respectively the average contents of C, Mn, Si, Al, Cr that are measured under the zinc coating of said sheet A over a depth ranging from 0 to 100 microns.

6. A method according to claim 1, wherein at least one of the steel sheets welded to steel sheet (A) is a zinc or zinc-alloyed coated steel sheet (B) and wherein the sum of the thicknesses of sheets (A) and (B) is 3 mm or less.

7. A method according to claim 6, wherein the sum of the thicknesses of sheets (A) and (B) is 2 mm or less.

8. A method according to claim 6, wherein the zinc or zinc-alloyed coated steel sheet (B) is a steel with a composition containing:
C≥0.04%; and
Mn≥0.2%
the remainder being Fe and unavoidable impurities.

9. A method according to claim 1, wherein 125 μm≤(IDepth)≤18.68 ($Zn_{sol}$)−55.1.

10. A method according to claim 1, wherein (IDepth) is measured through a displacement of the welding electrode, and wherein the welding process is stopped when (IDepth) is comprised between 100 microns and 18.68 ($Zn_{sol}$)−55.1.

11. A method according to claim 10, wherein (Depth) is measured through the displacement of the welding electrode, and wherein the welding process is stopped when (IDepth) is comprised between 125 microns and 18.68 ($Zn_{sol}$)−55.1.

12. A method according to claim 1, wherein the welding parameters are selected so that a maximum temperature attained during welding at an external part of the indentation zone of the weld is such that:
$T_{max}$ (IDia)<Ac3
(IDia) being the location of the indentation diameter and Ac3 being the temperature of complete steel transformation into austenite during heating.

13. A method according to claim 1, further comprising the step:
using the resistance spot weld in a structural or safety part for an automotive vehicle.

14. A resistance spot weld comprising at least two steel sheets with thicknesses comprised between 0.5 and 3 mm, at least one of the sheets being a zinc or zinc-alloy coated steel sheet (A) with a tensile strength (TS) higher than 800 MPa and a total elongation (TEL) such as (TS)×(TEL)>14000 MPa %, wherein a composition of the steel substrate of (A) contains, in weight:
0.05%≤C≤0.4%
0.3%≤Mn≤8%
0.010%≤Al≤3%
0.010%≤Si≤2.09%
with 0.5%≤(Si+Al)≤3.5%
0.001%≤Cr≤1.0%
0.001%≤Mo≤0.5%
and optionally
0.005%≤Nb≤0.1%
0.005%≤V≤0.2%
0.005%≤Ti≤0.1%
0.0003%≤B≤0.005%
0.001%≤Ni≤1.0% the remainder being Fe and unavoidable impurities,
wherein 100 μm≤(IDepth)≤18.68($Zn_{sol}$)−55.1,
wherein (IDepth) is an indentation depth on a surface of said steel sheet (A) and is in micrometers and wherein $Zn_{sol}$ is the solubility of Zn in the steel of sheet (A) at 750° C., in weight %,
wherein $Zn_{sol}$ is determined according to the method comprising the following successive steps:
providing the zinc or zinc-alloy coated steel sheet (A), then
heat-treating the coated steel sheet (A) at 750° C. for a duration of 170 h, then
cooling the sheet (A) at a rate higher than 50° C./s, then
measuring the Zn content in the steel at a distance of 1 micron from the steel/Zn or Zn-alloy coating interface.

15. A resistance spot weld according to claim 14, wherein 125 μm≤(IDepth)≤18.68($Zn_{sol}$)=55.1.

16. A resistance spot weld according to claim 14, wherein the at least one of the sheets being a zinc or zinc-alloy coated steel sheet (A), has a composition containing Si≥0.5%.

17. A resistance spot weld according to claim 16, wherein the at least one of the sheets being a zinc or zinc-alloy coated steel sheet (A), has a composition containing Si≥0.7%.

18. A resistance spot weld according to claim 14, wherein the at least one of the sheets being a zinc or zinc-alloy coated steel sheet (A) contains a surface fraction of retained austenite comprised between 7 and 30%.

19. A resistance spot weld according to claim 14, wherein the at least one of the sheets being a zinc or zinc-alloy coated steel sheet (A) contains an average of local concentrations in C, Mn, Al, Si and Cr, over a depth comprised between 0 and 100 microns, which is different from the bulk composition of the steel sheet (A), said average of local concentrations in C, Mn, Al, Si and Cr being measured by Glow-Discharge Optical Emission Spectroscopy (GDOES).

20. A structural or safety part for automotive vehicles comprising:
a resistance spot weld according to claim 14.

* * * * *